Figure 5:
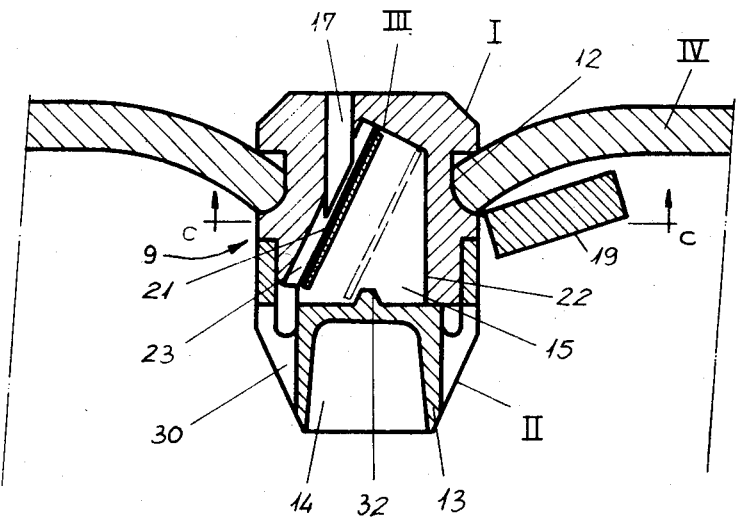

United States Patent [19]

Raz

[11] Patent Number: 4,593,857
[45] Date of Patent: Jun. 10, 1986

[54] IRRIGATION EMITTER UNIT

[75] Inventor: Dan Raz, Haifa, Israel

[73] Assignee: Plassim Limited, Kibbutz Merhavia, Israel

[21] Appl. No.: 668,636

[22] Filed: Nov. 6, 1984

[30] Foreign Application Priority Data

Nov. 30, 1983 [IL] Israel ................................. 70355

[51] Int. Cl.⁴ ............................................. A01G 25/02
[52] U.S. Cl. .................... 239/109; 239/272; 239/542; 239/547; 239/553.3
[58] Field of Search ................. 239/106–109, 239/271, 272, 533.1, 542, 547, 553.3; 138/46

[56] References Cited

U.S. PATENT DOCUMENTS

| | | | |
|---|---|---|---|
| 984,082 | 2/1911 | Edgerton | 239/542 |
| 3,269,664 | 8/1966 | Lamb et al. | 239/272 |
| 3,693,888 | 9/1972 | Rondas et al. | 239/542 X |
| 3,777,980 | 12/1973 | Allport | 239/542 X |
| 3,831,860 | 8/1974 | Gullaksen et al. | 239/553.3 |
| 4,058,257 | 11/1977 | Spencer | 239/107 |
| 4,288,035 | 9/1981 | Rosenberg | 239/542 X |
| 4,344,576 | 8/1982 | Smith | 239/542 |
| 4,392,616 | 7/1983 | Olson | 239/271 |
| 4,424,936 | 1/1984 | Marc | 239/271 |
| 4,502,631 | 3/1985 | Christen | 239/542 X |

FOREIGN PATENT DOCUMENTS 935011  6/1982  U.S.S.R. ............................ 239/542

Primary Examiner—Andres Kashnikow
Attorney, Agent, or Firm—Frishauf, Holtz, Goodman & Woodward

[57] ABSTRACT

A drip irrigation emitter is located in the wall (IV) of a flexible irrigation pipe. It contains a flow control chamber (15) which communicates with the pipe interior through a filter (II) and with the outside through an outlet passage (17) extending radially through the top portion (11). The chamber (15) is formed by two parallel side walls (20, 20'), a ribbed rear wall (22), and an arched front wall (21) which is incised along its center by a deep channel (23') merging with the arched portion (21) in the shape of two sloping banks (23''). The channel (23') merges at its upper end with the outlet passage (17). Control of the water outflow is made by a thin, rectangular and resilient plate (III) which fits and moves freely between the side walls and is pressed onto the arched front wall (21) by water pressure. Increasing pressure gradually urges the plate onto the banks (23'') and into the channel (23'), thereby diminishing the throughflow cross-section and increasing flow resistance.

14 Claims, 15 Drawing Figures

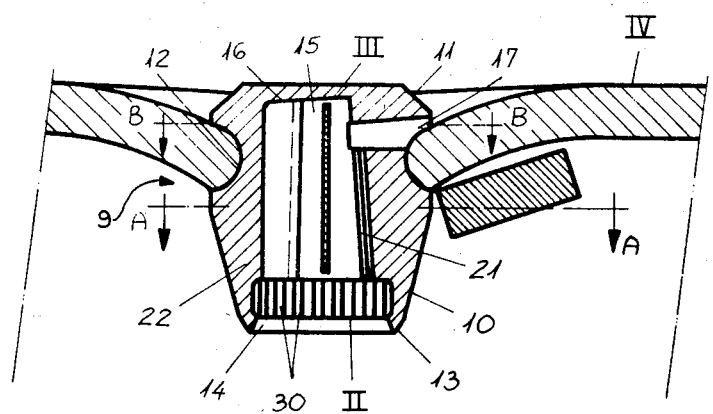
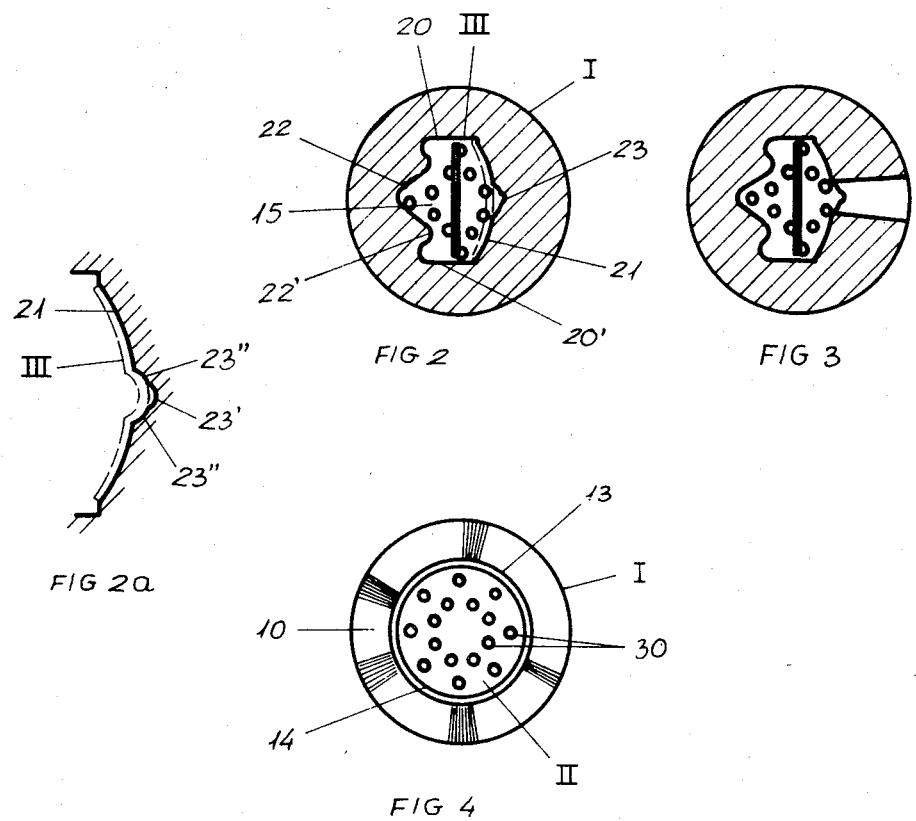

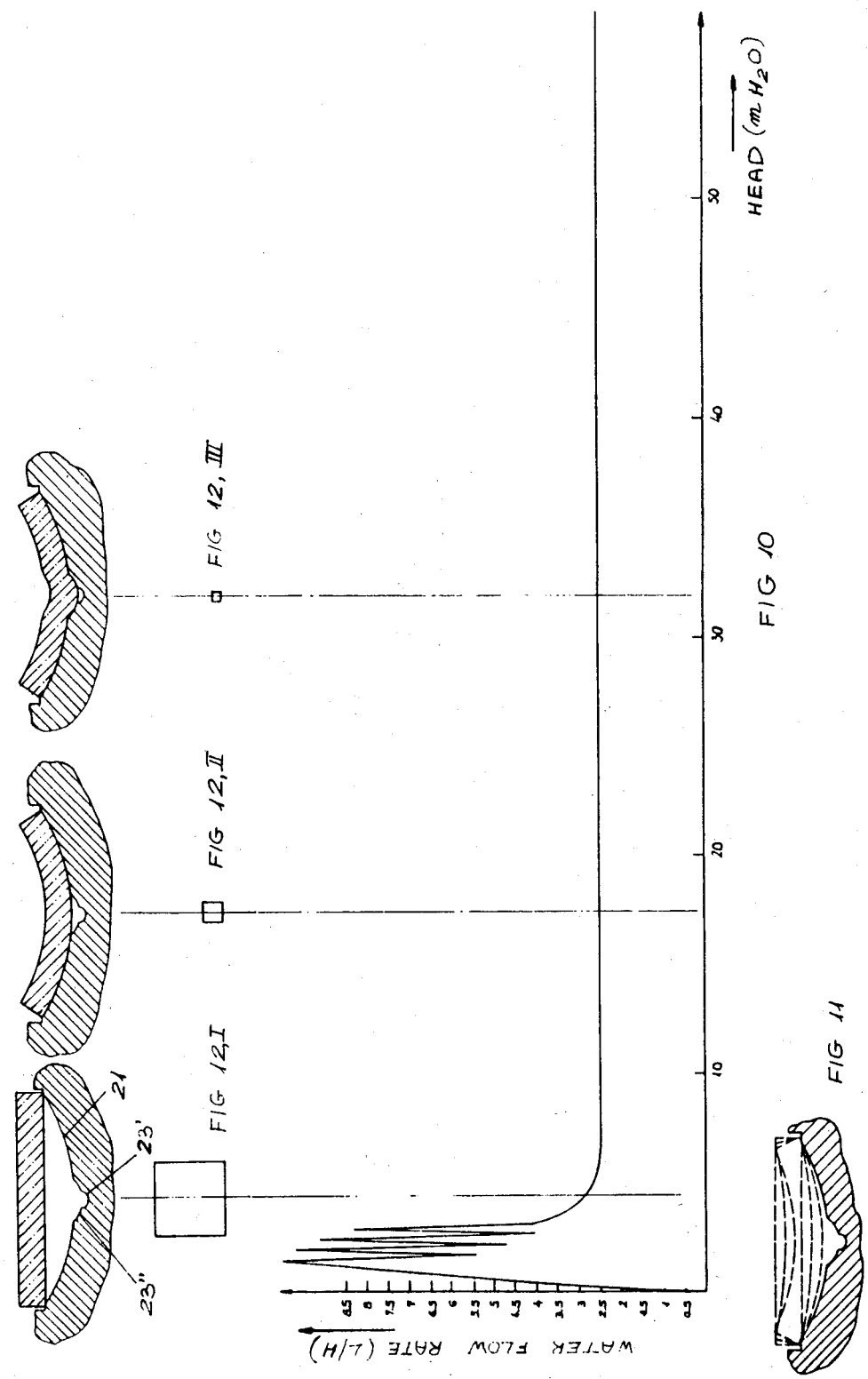

IRRIGATION EMITTER UNIT

The invention relates to a drip-irrigation emitter adapted to emit a substantially constant water flow over a comparatively large range of different pressure in the supply line, and it relates particularly to a drip irrigation emitter of the kind inserted at predetermined intervals into the wall of a flexible pipe.

Various kinds of drip irrigation emitters are known purporting to emit water at a uniform rate independent of the water pressure in the supply line, i.e. the pipe or hose to which the emitters are attached. The most common type comprises a labyrinth passage serving to reduce the inlet pressure so that water is emitted in a trickle only but, evidently, the flow is not constant, more water trickling through the labyrinth at higher pressure than at lower. In addition the long passage is apt to be clogged by sand or other foreign bodies in the water and is practically not given to cleaning.

Another kind of emitter comprises a relatively large outlet opening and a fixed diaphragm adapted to gradually diminish the cross section of the outlet passage with increasing supply pressure. A similar device comprises a water duct in the shape of an elongated channel, one side of which is formed by a resilient membrane; the inflow fluid pressure acts on the membrane from the outside of the channel thus diminishing its cross section with increasing pressure and thus increasing the flow resistance and maintaining the same water outflow. These types of emitters are less liable to clogging. However, the movement of the fixed diaphragm is not conducive to equal outflow under varying pressure conditions. In addition, the passage through the emitter is necessarily of small dimensions and may be either totally clogged or be partly obstructed by foreign bodies, limiting the movement of the diaphragm towards the outlet opening or the channel respectively.

Other types of drip irrigation emitters comprise a combination of a labyrinth passage with a diaphragm-controlled outlet opening. However, these are done also without eliminating the possibility of clogging. The main drawback of the known devices is the difficulty to remove clogging particles by flushing, for the reason that the fixed diaphragm does not allow wide passages to be provided.

To overcome the drawback of the fixed diaphragm it has been proposed, in U.S. Pat. No. 4,288,035, to provide a control device in the form of a hard free-floating disc adapted to create a flow-resisting passage, but this device has proved itself too rigid for the purpose and has resulted in wide flow variations, owing to the stiffness of the disc.

Another emitter of this kind is disclosed in U.S. Pat. No. 4,344,576, wherein a resilient wafer is free to float in a circular chamber, one planar side of which contains an elongated channel having both a wide, shallow profile and a narrow deep profile, this channel merging with the water outlet of the emitter. The chamber communicates with the supply pipe through a threaded shank pushed through the pipe wall and held therein by the teeth of the thread. The resilient wafer is positioned in the chamber between inlet and outlet, its surfaces perpendicular to the general direction of the water flow; it is pressed onto the wall containing the channel and into the channel itself depending on the water pressure in the supply pipe, thereby gradually decreasing the cross-sectional area of the channel and increasing the frictional resistance to the flow.

Flushing action of the emitter is described to take place at low water pressure which leaves both the shallow profile and the steep profile free of the wafer, thus permitting water to flow through the channel unhindered and to flush impurities out through the outlet, but it can be seen from the design that only at very low pressure the wafer will be lifted off the channel, and at this pressure the flow will become too low to efficiently flush foreign bodies out of the channel and the chamber.

It can be shown that this emitter has certain drawbacks the elimination of which is the object of the present invention. The fact that the resilient wafer is disc-shaped results in the participation of only a small portion of the entire surface in entering the channel, leaving the remainder of the disc ineffective in regard to pressure control. In fact the wafer is pressed onto the planar surface by the water pressure, thus making its action not different from that of a fixed diaphragm. Flushing becomes frequently necessary as there are no filtering means provided, and there is the danger of a grain of sand being wedged between the respective surfaces of the chamber wall and the wafer, completely changing the flow characteristics.

Another drawback is the fact that the major part of the emitter is on the outside of the pipe, presenting the danger of the emitter being pulled out of its opening in the pipe when this is being dragged across the ground while being moved between locations.

It is, therefore, the main object of the present invention to obviate the above drawbacks and to provide a trickle irrigation emitter that shall emit a substantially constant small quantity of liquid at different pressures but, at the same time, permit ready cleaning by flushing through sufficiently wide passages.

It is another object to provide an emitter of very small dimensions and simple design at low cost.

And it is a further object to provide drip irrigation emitters which can be fitted into a flexible hose at predetermined intervals, without the use of special, auxiliary tools, and which will be tightly fastened in the hose wall without danger of leaking.

The emitter of the present invention is similar to the aforedisclosed invention, in that a resilient plate decreases the cross-sectional area of a channel, thereby increasing the flow resistance in such a way that the emitted water quantity remains constant over a large range of supply pressures. However, in order to overcome the aforementioned drawbacks, a completely different design is being utilized resulting in an emitter of very efficient operation.

With a view to obtaining a practically smooth exterior of the flexible irrigation pipe in which a plurality of emitters are inserted, these are built to protrude out of the pipe wall with their outlet openings only, permitting pulling and dragging of the pipe with no danger of tearing an emitter out of the wall. In addition, owing to ingenious dimensioning of the opening in the pipe wall and of the portion of the emitter fastened therein, the pipe wall forms a depression around the emitter which thus does hardly project out of the pipe contours.

The chamber and the resilient plate are so designed that the chamber area becomes substantially unobstructed during flushing which permits thorough cleaning of the emitter interior. And, finally, a filter forming the water inlet prevents, as far as possible, dirt from entering the emitter.

The drip irrigation emitter of the present invention comprises an axi-symmetrical housing having a bottom end provided with a water inlet and adapted to be positioned inside a flexible irrigation pipe, and a top end provided with a water outlet and adapted to protrude out of the pipe wall. The housing encloses a flow control chamber having a bottom formed by a filter in the water inlet, a flat top, a rear wall, and an arched front wall of substantially uniform curvature which contains a central, narrow and deep channel, merging on both sides with the arched front wall in the form of curved, sloping banks, the channel merging at its top end with the outlet aperture. A control member in the shape of a thin resilient plate of a length with the height of the chamber and of a width slightly smaller than the distance between the side walls, is freely movable in the chamber and is adapted to be urged towards the front wall by low water pressure and to be gradually pressed into the channel and its banks by increasing pressure, thereby decreasing the cross-sectional area of the channel and its banks leading to the outlet, in a predetermined relation to the water pressure.

The control chamber preferably comprises two planar and parallel, opposite side walls which are narrow in relation to the width of the front and of the rear wall, the latter two converging towards the top of the chamber. The control plate enclosed in the thus-shaped chamber is of rectangular configuration and is made of rubber or other suitable elastomers. The rear wall is provided with longitudinal ridges which serve to prevent close adherence of the plate, thus permitting the full water pressure to build up behind the plate and to urge it towards the front wall.

The control plate and the profile of the deep channel are so designed that at the maximum design pressure the bottom of the channel remains open and unobstructed, permitting a minimum quantity of water to pass through to the outlet, equal to the design flow. It is important that the liquid outlet be of larger cross section than that of the inlet so as to permit a grain of sand or the like to pass through to the outside when the device is cleaned by flushing.

The housing is axisymmetrical and consists of a bottom portion intended to protrude into the flexible pipe, in the shape of a cone frustum with its bottom end forming a sharp circular cutting edge, and a circular top portion containing a neck portion to be seated in the pipe wall in the form of a circumferential groove of semicircular cross section and of an inner diameter slightly larger than that of the cutting edge. The portion of the housing intended to protrude out of the hose wall is of low height and contains the liquid outlet extending from the chamber outwards in radial direction.

The emitter controls the water outflow in the following manner:- water starting to flow through the emitter flushes its interior, while the control plate rests close to the rear wall of the chamber, thus creating a large space suitable for complete flushing of the chamber. With increasing pressure the flow increases, causing the control plate to be lifted off the rear wall and to be moved towards the front wall in fluttering motion, whereby any sediment remaining on the chamber walls is shaken off and flushed out. At the end of the vibratory movements the plate is suddenly yanked onto the front wall and is bent to its curvature so as to closely adhere to it. This creates a closed duct formed by the channel and its banks covered by the plate, which is only open at the bottom end close to the water inlet. With increasing pressure the plate is bent additionally so as to gradually cover the two banks of the channel and eventually to partly enter the channel proper. Even at the maximum design pressure, a portion of the channel section remains open so that the water flow is never interrupted. The cross section of the channel and the banks and the properties of the resilient control plate are so determined, both by calculation and experimentally, that a substantially constant flow is obtained within a given range of supply pressures.

As soon as water supply is interrupted and the pressure has dropped to a predetermined value the control plate is freed from contact with the curved front wall owing to its elasticity and places itself somewhat in the chamber, and in most cases it lies close to the rear wall. Hereby a large passage is opened between inlet and outlet, and the remaining water passing therethrough flushes the interior and removes any foreign particles which may obstruct the correct control of water flow.

The sharp cutting edge at the bottom end of the housing serves to position the emitter in the wall of a rubber or plastic pipe or hose without previously punching or drilling a hole in the wall. Instead, the emitter is positioned in its predetermined spot on the pipe and driven into it by a light hammer blow. The cutting edge cuts a round hole through which the frusto-conical portion is driven, until the pipe wall closes around the circumferential groove. The curved cross section of the groove takes care of permanent sealing, independent of the internal pressure, by closely adhering to the pipe wall. The insertion of the emitter into the pipe is not necessarily done by manual work, but may be carried out by hydraulical, pneumatical or mechanical apparatus, specially designed for this task.

Figure 6:
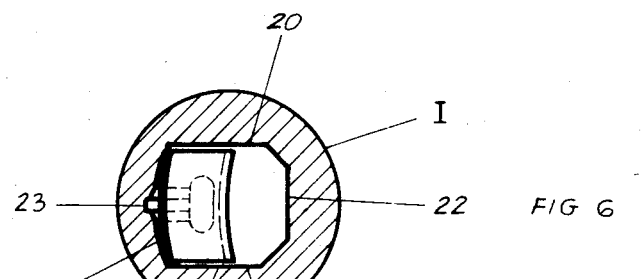
Figure 7:
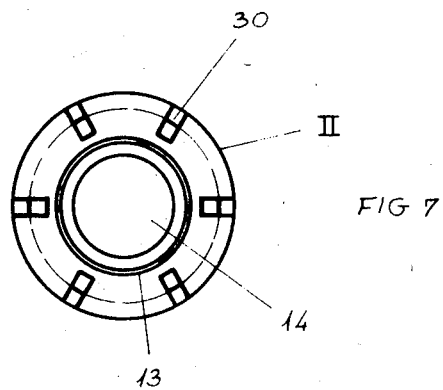
Figure 9:
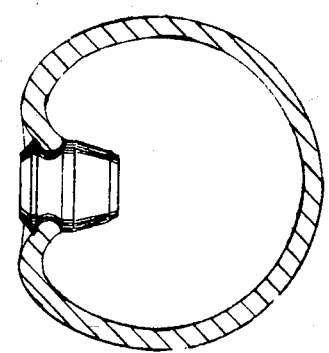
Figure 8:
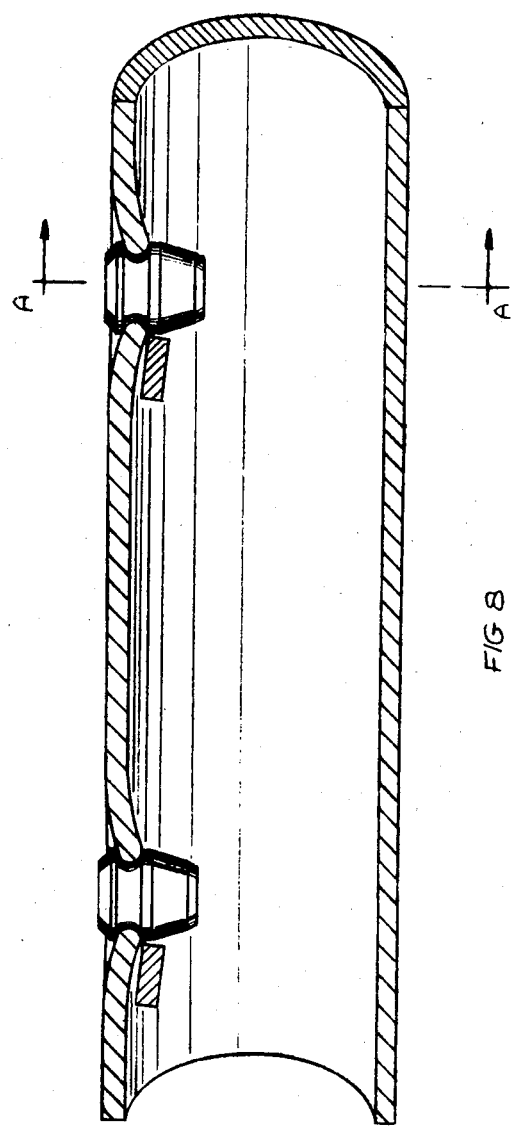

For clearer understanding the invention will now be more fully described with reference to the accompanying drawings, wherein FIG. 1 is a vertical section through a drip irrigation emitter mounted in the wall of a flexible pipe, FIG. 2 is a section along the line A—A of FIG. 1, FIG. 2a is an enlarged section of the front wall of the chamber shown in FIG. 2, FIG. 3 is a section along the line B—B of FIG. 1, FIG. 4 is a bottom view of the emitter illustrated in FIG. 1, FIG. 5 is a vertical section through another embodiment of the emitter, mounted in the wall of a flexible pipe, FIG. 6 is a section along C—C of FIG. 5, FIG. 7 is a bottom view of the emitter illustrated in FIG. 5, FIG. 8 is a longitudinal section through a flexible pipe including two emitters of the aforedescribed kind inserted into its wall, FIG. 9 is a section along line A—A of FIG. 8, FIG. 10 is a diagram showing the actually measured output of an emitter of the kind referred to in relation to the input water pressure, FIG. 11 illustrates, in diagrammatical form, a section through the front wall of the chamber and through the control plate in three different stages of closing the duct along the front wall, and FIG. 12, I, II and III, illustrates the position of the control plate and the throughflow area of the duct in relation to the input water pressure appearing in the diagram of FIG. 10, directly underneath the center of each of the FIGS. I, II and III.

With reference to FIGS. 1 through 4 of the drawings, a drip irrigation emitter comprises an axi-symmetrical housing I, a filter II, and a control plate III. The emitter is shown to be inserted in a round hole in the wall IV of a flexible pipe, with the major, bottom portion 10 protruding into the pipe, and with a short, top portion 11 jutting out of the pipe into the open, both top and bottom portion merging with a neck portion 9. Both the bottom portion and the top portion are in the shape of cone frustums, but it is important to note that the shape of the top portion is irrelevant, while the frusto-conical shape of the bottom portion 10 is imperative to the mode of insertion of the emitter into the pipe wall.

For the purpose of inserting the emitter into a flexible pipe the bottom portion 10 terminates in a sharp circular cutting edge 13 which is formed between the bottom end of the cone frustum on the outside and the bottom end of a cylindrical cavity 14 inside the bottom portion, which acts as liquid inlet and also serves to accommodate the filter II. The neck portion 9 is recessed in the shape of a circumferential groove 12 of semicircular cross section which engages with the wall IV of the pipe; the inner diameter of the groove is slightly larger than that of the circular cutting edge 13 of the bottom portion, in order to ensure close adherence of the wall to the recessed portion. The housing encloses a coaxial chamber 15 which merges with the cavity 14, its bottom being formed by the upper surface of the filter II, while its top 16 is flat and slightly inclined to the housing axis. The chamber is formed by a front wall 21 and a rear wall 22 slightly converging towards the top and of two planar parallel side walls 20, 20' which are narrow compared with the width of both the front and the rear wall. The rear wall is of wavy cross section in the form of two longitudinal ribs 22' which prevent the plate III from closely sticking to the wall. The front wall consists mainly of an arched portion 21 (FIG. 2) of uniform curvature which is incised along its center by a channel 23, which comprises a deep, small-radius channel 23' and two sloping banks 23" of a larger radius than that of the channel 23', but of a smaller radius than that of the arched portion 21. The arched portion extends all along the chamber, from the filter surface to the top 16, while the channel 23 stops short off the top where it merges with a liquid outlet passage 17 which extends to the outside of the housing in substantially horizontal direction. The filter II is in the shape of a flat disc perforated by a plurality of small, axially extending holes 30. It is pressed into the cavity 14 after insertion of the plate III into the chamber and held there by elasticity of the material, i.e. by snap fit.

The plate III is a very thin, rectangular rubber or plastics sheet which fits freely between the side walls 20, 20' and between the top 16 and the filter III. In FIG. 2 the plate is shown,—in broken lines—to be pressed onto the arched front wall by low water pressure.

The action of the plate is more clearly illustrated in FIG. 2a, where it is shown to be sharply bent and partly entering the channel portion 23' by higher water pressure. This movement decreases the cross section of the channel to a predetermined degree, whereby the resistance to water flow from the bottom of the chamber to the outlet is increased. As mentioned before, the dimensions of the channel and of the plate, its elasticity, and other features have been determined by research and experiment, in order to obtain a constant water outflow at various inlet pressures.

The properties of the plate material may vary from Shore Hardness 20 to 98, while the elasticity may vary between 20% and 98%.

The material of the housing and the filter is preferably plastics produced by injection molding, but it may also be a non-ferrous metal produced by die-forming.

A drip irrigation emitter working on the same principle is illustrated in FIGS. 5, 6 and 7, and the same numerals are utilized to indicate components which are identical or corresponding to the components of FIGS. 1 through 4. The main difference between the two embodiments is the form of the filter II which, in the present embodiment, constitutes a portion of the frusto-conical bottom part of the emitter, forms a separate part and is attached to the housing I. The filter apertures are in the form of radial slots penetrating through the frusto-conical surface into the chamber 15. The other main point is the upwards direction of the outlet passage 17 which connects the channel 23 with the top surface of the emitter. The plate III is shown, in full lines, in close proximity of the front wall and, in broken lines, in the middle of the chamber, where it is held by a ridge 32 and prevented from lying close to the rear wall 22.

The circumferential groove 12 of the present embodiment is of a somewhat different cross section than the groove in the aforedescribed emitter, in that its cross section is rectangular with its lower portion rounded. It is this rounded portion of the groove which ensures tight sealing of the emitter in the pipe wall, since inside pressure on the bottom of the emitter presses the groove walls more intimately into the pipe wall.

Both embodiments have been designed for being inserted into a flexible irrigation pipe of rubber or plastic by one light blow of a hammer or by using a special tool operated either mechanically, pneumatically or hydraulically. After having been placed on a predetermined point on the pipe the emitter is driven into the pipe wall by one of the above means, whereby the sharp circular cutting edge cuts a smooth-edged, circular hole into the pipe wall, and subsequently the bottom portion is pushed into the pipe interior until the circular groove is surrounded by the pipe wall. Owing to the fact that the cutting edge is of smaller diameter than the diameter of the groove at its deepest point, the pipe wall is bent inwardly so as to form a depression around the emitter top portion, thus avoiding the protrusion of the emitter top beyond the pipe contour. This depression is well visible in FIGS. 1, 5, 8 and 9, which show that the top portion of the emitter hardly protrudes beyond the periphery of the pipe, a matter of great importance during dragging of the pipe. It is advantageous to leave one small section of the circular cutting edge blunt, causing this section not to contribute to the shearing action and causing the cut-out disc to remain attached to the pipe wall. This cut-out portion is visible in FIGS. 1, 5 and 8, of the drawings and is marked by the numeral 19. It, therefore, does not drop into the pipe which could lead to blocking the passage through the pipe, especially if a large number of such cut-outs gather in one spot.

A similar method of opening a hole in a pipe was disclosed in U.S. Pat. No. 4,392,616: herein a drip irrigation emitter has a frusto-conical barb portion integral with the neck portion, and a cylindrical portion extending from the small end of the barb portion, which is usable as a mechanical punch to open a hole in the pipe wall and to attach the emitter to the pipe, in one operation.

It can, however, be shown that the cylindrical portion tears the wall leaving an opening with ragged edges which cannot prevent water from penetrating between neck and pipe wall. This is being remedied in the present emitter by providing a sharp-edged cutting edge which serves to cut a smooth hole capable of hugging the groove so as to prevent water from penetrating. The neck portion of the emitter of the quoted patent is of rectangular cross section which does assist in sealing the neck portion and the wall. The specification also discloses that a portion of conduit material is severed which drops into the pipe interior and may cause clogging and obstructing of the water flow.

FIGS. 10, 11 and 12 show a curve of test results with an emitter of the kind illustrated in FIG. 1, as well as the position of the control plate at various pressure heads. The curve shows that up to about 6 m head (0.6 bar) the control plate is remote from the front wall and vibrates as indicated by the rapid pressure changes; during this period the output is relatively high, and complete flushing takes place. At this point it should be mentioned that similar flushing action takes place at the end of every irrigation cycle, as soon as the pressure has dropped to the point at which the plate frees itself from contact with the front wall and is free to move in the chamber.

At about 6 m the control plate starts to adhere to the curved front wall (FIGS. 12,I and II), leaving the channel (23') and its banks (23") open in the form of a duct. With increasing pressure the plate is pressed onto the banks and gradually into the channel, whereby the output remains constant while the cross section is reduced down to its final value shown in FIG. 12,III. This is so determined that at the maximum head of about 60 m the output remains at its constant value of about 2.5 liter per hour.

While comparing the embodiments of the emitter illustrated in FIGS. 1 and 5 respectively, it will be understood that the emitter of FIG. 1 provided with a radial water outlet close to the pipe surface has certain advantages over that with an axial outlet :- In drip irrigation it is being experienced that water falling only on one spot out of the entire area to be irrigated causes the salinity of the soil in this spot to increase rapidly. Now viewing the emitter in FIG. 1 it can be visualized that water trickling out of the outlet close to the pipe wall will seep along the pipe and will irrigate an area all along it and not only in the vicinity of the emitter. In this way concentration of salinity in one point is avoided since the water drops off the pipe along its entire length. Other apparent advantages of the present emitter are the double flushing action, both at the beginning and at the end of each irrigation cycle, and the initial prevention of foreign bodies from entering the emitter due to the built-in filter.

Another important feature is the fluttering movement of the control plate during flushing, causing rapidly changing pressure waves which add considerably to the removal of sediments, should any have accumulated.

The low profile of the emitter and the recess in the pipe caused by its fastening method contributes to ease of transport of the irrigation pipe between sites and results in less damage to the emitter fastened thereto compared with conventional emitters provided with a large outside portion.

Owing to the original features the emitter is of very small dimensions, again compared with known emitters of similar throughput, a fact which causes reduction of cost both in regard to material and labor.

The final advantage is the manner of insertion of the emitter into the wall of a flexible pipe which permits full automatisation by using mechanical, pneumatical or hydraulical devices for feeding and inserting the emitters into a stepwise-moved flexible pipe.

I claim:
1. A drip irrigation emitter comprising
   an axisymmetrical housing having a bottom portion, intended for insertion into a flexible irrigation pipe, in frusto-conical shape and provided at its small end with a central water inlet surrounded by a sharp circular cutting edge, a top portion provided with a water outlet intended for protrusion out of said irrigation pipe, and a cylindrical neck portion provided with a circumferential groove of an innermost diameter larger than said circular cutting edge and of a width larger than the thickness of the wall of said flexible pipe;
   a flow control chamber positioned in said housing, said chamber having a bottom formed by a filter in said water inlet, a flat top, two planar side walls, a rear wall provided with protrusion means to prevent close adherence of a flow control member to said rear wall, and a front wall arched away from the rear wall around a radius of curvature extending axially of the housing and at a substantially uniform curvature, said front wall comprising a channel extending in the axial direction of the housing and communicating the central water inlet with said water outlet;
   said flow control member being in the shape of a thin, resilient plate of a length commensurate with the height of said chamber and of a width slightly smaller than the distance between said planar side walls, said control member being freely movable in said chamber and adapted to be urged towards said front wall by low water pressure and to be gradually pressed into said channel and its banks by increasing water pressure, thereby decreasing the cross sectional area of said channel and said banks leading to said outlet, in a manner designed to provide a substantially constant outflow at different water pressures in said pipe.

2. The emitter of claim 1, wherein said filter in said liquid inlet is in the shape of a flat disc provided with a plurality of narrow openings.

3. The emitter of claim 2, wherein said filter is in the shape of a flat disc perforated by a plurality of small-diameter holes, said disc being fastened in a recess in the bottom of said housing by means of a snap-fit.

4. The emitter of claim 1, wherein said liquid outlet in said top portion extends from the top of said channel in radial direction.

5. The emitter of claim 1, wherein said liquid outlet in said top portion extends from the top of said channel in axial direction.

6. The emitter of claim 1, wherein said two side walls of said chamber are in parallel alignment and are of smaller width than said front wall.

7. The emitter of claim 6, comprising a flow control member in the shape of a thin resilient, rectangular plate.

8. The emitter of claim 1, wherein said rear wall is provided with two protruding ribs extending from top to bottom of said chamber.

9. The emitter of claim 1, wherein said circumferential groove of said neck portion is of semi-circular cross section.

10. The emitter of claim 1, wherein said circular cutting edge is formed between two conical surfaces.

11. The emitter of claim 10, wherein a small portion of said cutting edge is blunt.

12. The emitter of claim 1, wherein the channel is located in the center of said front wall.

13. The emitter of claim 1, wherein said channel is defined by a curved surface in said front wall.

14. The emitter of claim 1 wherein said curved surface is comprised of two curvatures, with the curvature along its center extending deeper into said front wall than the curvature along its sides.

* * * * *